April 22, 1958 F. R. SMITH 2,831,713
DIRT SEAL FOR BEARINGS
Filed April 20, 1954 2 Sheets-Sheet 1

INVENTOR.
FREDERIC R. SMITH
BY
Barnes, Kisselle, Laughlin & Rauch
ATTORNEYS

April 22, 1958     F. R. SMITH     2,831,713
DIRT SEAL FOR BEARINGS
Filed April 20, 1954
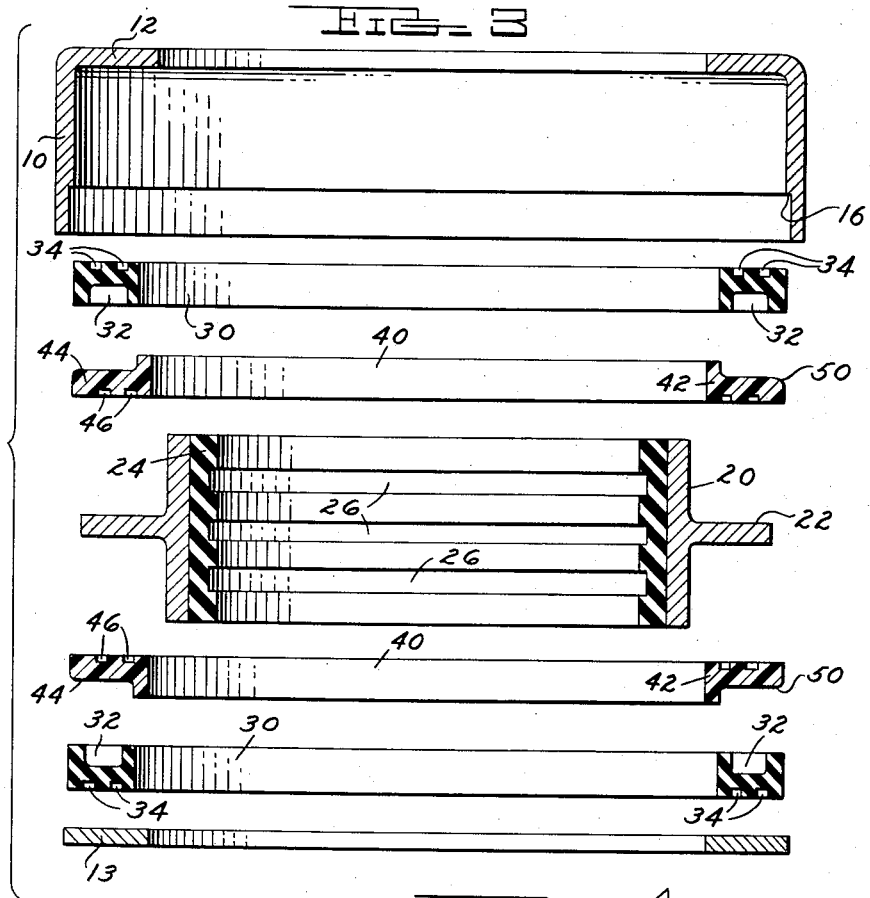
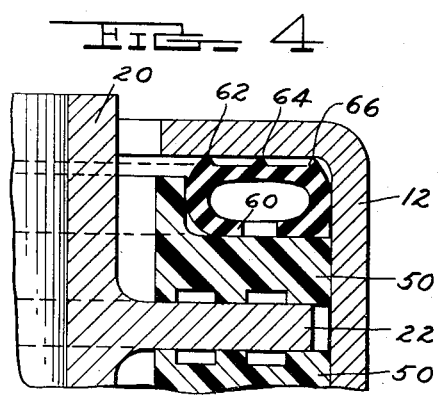
INVENTOR.
FREDERIC R. SMITH
BY
ATTORNEYS

United States Patent Office 2,831,713
Patented Apr. 22, 1958

2,831,713

DIRT SEAL FOR BEARINGS

Frederic R. Smith, Whitmore Lake, Mich., assignor to O & S Bearing & Mfg. Co., Whitmore Lake, Mich., a corporation of Michigan Application April 20, 1954, Serial No. 424,410

2 Claims. (Cl. 286—11.13)

This invention relates to a dirt seal for bearings and is particularly adapted to the sealing of relatively rotating parts against the introduction of mud, dirt and dust. The device also assists in the retention of lubricant on the inside of assembled parts.

It is an object of the invention to provide an improved seal for rotating shafts relative to a housing, which seal will permit a certain eccentricity in the shaft which can seldom be avoided except in extremely expensive constructions and which seal will also permit some distortion of the bearing parts, that is, angled on the part of the shaft with respect to its housing without destroying the effective sealing relation.

The problem with this type of seal has been approached by many inventors, and there have been numerous attempts to solve it. The present solution, however, has proved to be successful over many other attempts and has an outstanding performance record in tests.

Briefly, the invention consists of an outer housing member, an inner member having a radial flange projectable into the outer housing with the unique sealing construction on either side of the radial flange within the housing to permit the various motions above described without destroying the seal.

Other objects and features of the invention will be apparent in the following description and claims.

Figure 1:
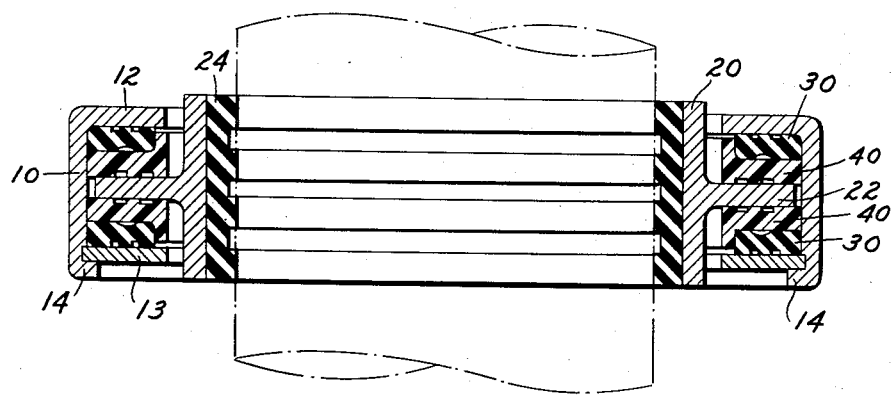

Drawings form a part of the disclosure, and the various views thereof may be briefly described as:

Figure 1, an assembly view showing the parts in section in normal position.

Figure 2:
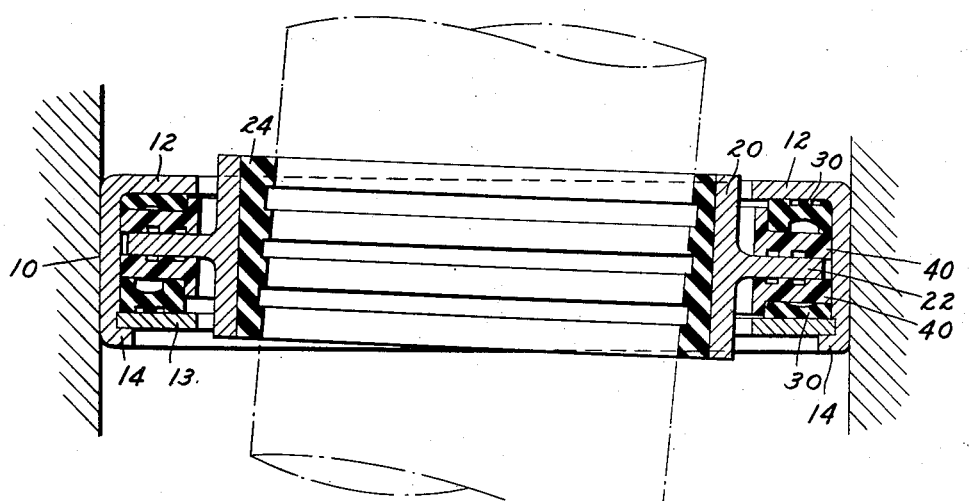

Figure 2, a similar assembly and illustration of the manner in which the assembly can absorb distortion.

Figure 3, an exploded view illustrating each of the parts prior to assembly.

Figure 4, a partial section showing a revised ring design for the compressible part.

Referring to the drawings, a sheet metal annulus channel shaped in cross section is formed by a member 10 having a side flange 12 in conjunction with an independent side ring 13 which in assembly is held in place by an inturned flange 14. The side ring 13 seats against a shoulder 16 in the ring 10 in assembly. The inner sealing member comprises a cylindrical metallic part 20 having a centrally located radial flange 22.

On the inner cylindrical surface of the part 20 is bonded a rubber liner 24 having spaced annular grooves 26 extending into the inner surface and spaced from the outer edges. This liner is molded to the shell and preferably is Buna-N synthetic rubber with 80 to 90 durometer hardness. On a bearing of approximately 5 inches in diameter, the grooves are about .030 inch deep and have side walls of about 15 degrees chamfer.

Annular sealing members are provided to lie within the metallic annulus 10 on either side of the radial flange 22. The outer of these parts consists of rubber rings 30, preferably formed of what is referred to as Buna-N synthetic rubber of approximately 45 durometer hardness. These rings have a single inside groove formation 32 which extends fairly deep into the body of the ring approximately to the center. On the other side of the ring two annular grooves 34 are formed.

Interposed between the flange 22 and the rings 30 are rings 40 formed preferably of a plastic material, such as nylon, having bearing consistency but inherent flexibility and flowability. This ring 40 has a cylindrical body portion 42 with a radial flange portion 44, the inner surface of the flange portion being provided with annular grooves 46. Nylon has been mentioned as a material for the parts 40, but material such as "Teflon" can also be used and other plastic equivalents.

In Figure 3 the parts are shown in exploded view and in their normal shapes. When the parts are assembled, there will be considerable distortion thereof, particularly of the rubber in view of the pressure used in the assembly.

As shown in Figure 1, the part 30, for example, has quite a different shape in assembly than it does when unconfined. It will be seen that the radial flange portion 22 of the inner member of the seal is capable of rotative and axial motion with respect to the nylon parts 40.

The flange 44 is provided with a radius 50 which facilitates to some extent the motion of the seal unit. Due to the distortability of the rubber, both the inner rubber member 24 and the sealing rubber members 30, the device can take considerable distortion without destroying the seal.

As viewed in Figure 2, the manner in which this takes place is illustrated; and it will be seen that the inherent resilience of the rubber maintains a seal on the facing walls of the respective parts regardless of the distortion. The part 30 is squeezed axially to almost one-half of its normal axial dimension, this being permitted by radial enlargement and by the particular grooved construction.

In Figure 4, a ring 60 is shown having a toroidal cross-section and provided with 60 degree included angle ribs 62, 64, 66 which are cemented to the wall of shell 12. In the complete assembly, the counterpart of member 60 would be cemented to the ring 13 at the other side of the shell. This construction has proved effective in operation.

In assembly, the part can run without lubrication or in the presence of oil or grease; and it will effectively seal out dust, dirt, water and other foreign substances that might be harmful to the inner bearing. Remarkable results have been obtained in use of this device under extreme conditions. The seal permits eccentric motion as well as off-center operation and also can absorb misalignment motion without destruction of the sealing characteristics. The shaft and inner members may settle with respect to the outer member 12 and still the seal will not be disturbed.

I claim:

1. A seal for relatively moving parts mounted in rotative relation which comprises an annulus with axially spaced radially extending walls fixedly mounted in relation to one of said parts, and a ring fixedly mounted with respect to the other of said parts having a radially extending flange projecting into said annulus wherein the radial walls of the annulus and the flange overlie each other in a substantial area, and means to provide a seal between said members which comprises resilient rings lying against the inside walls of said annulus having a U-shaped cross section with the open portion of the U facing away from the walls of said annulus and a flanged nylon ring on either side of said radial flange having a portion facing said flange adapted to have a moving contact therewith and having an axially extending portion projecting in retaining relation on the inner diameter of said resilient rings.

2. A moving type seal to be inserted between inner and outer bearing members which comprises means forming an annulus shell to be associated with one of said members, and means having an annular radial flange projectable into said annulus associated with the other of said members, said flange axially overlying the radial walls of said annulus, and means interposed between said walls and said flange on opposite sides of said flange comprising an annular resilient ring shaped in cross section to have pockets which permit deformation of the ring positioned against the inside of each wall of said annulus and a ring of smooth, hard plastic material interposed between said flange and said resilient ring, the parts being confined in assembly under partial compression to maintain said resilient rings in deformed condition in cross section, said resilient rings being, however, sufficiently expandable axially whereby a collapse of one of said rings by axial pressure will not relieve the other of said rings from axial confinement within said annulus, thus preventing separation of the contacting surfaces of said various parts, the plastic rings each being formed with an inner outwardly extending annular flange axially overlying and in proximate relation to the respective resilient rings which serves to assist in confining the resilient rings against inward radial displacement.

References Cited in the file of this patent

UNITED STATES PATENTS

| | | |
|---|---|---|
| 2,426,047 | Payne | Aug. 19, 1947 |
| 2,512,749 | McCloskey | June 27, 1950 |

FOREIGN PATENTS

| | | |
|---|---|---|
| 565,649 | Great Britain | Nov. 21, 1944 |
| 618,347 | Great Britain | Feb. 21, 1949 |